No. 840,019. PATENTED JAN. 1, 1907.
J. B. SCHUMAN.
SHOCK HANDLING ATTACHMENT FOR CROP TREATING MACHINES.
APPLICATION FILED APR. 17, 1905.
3 SHEETS—SHEET 1.
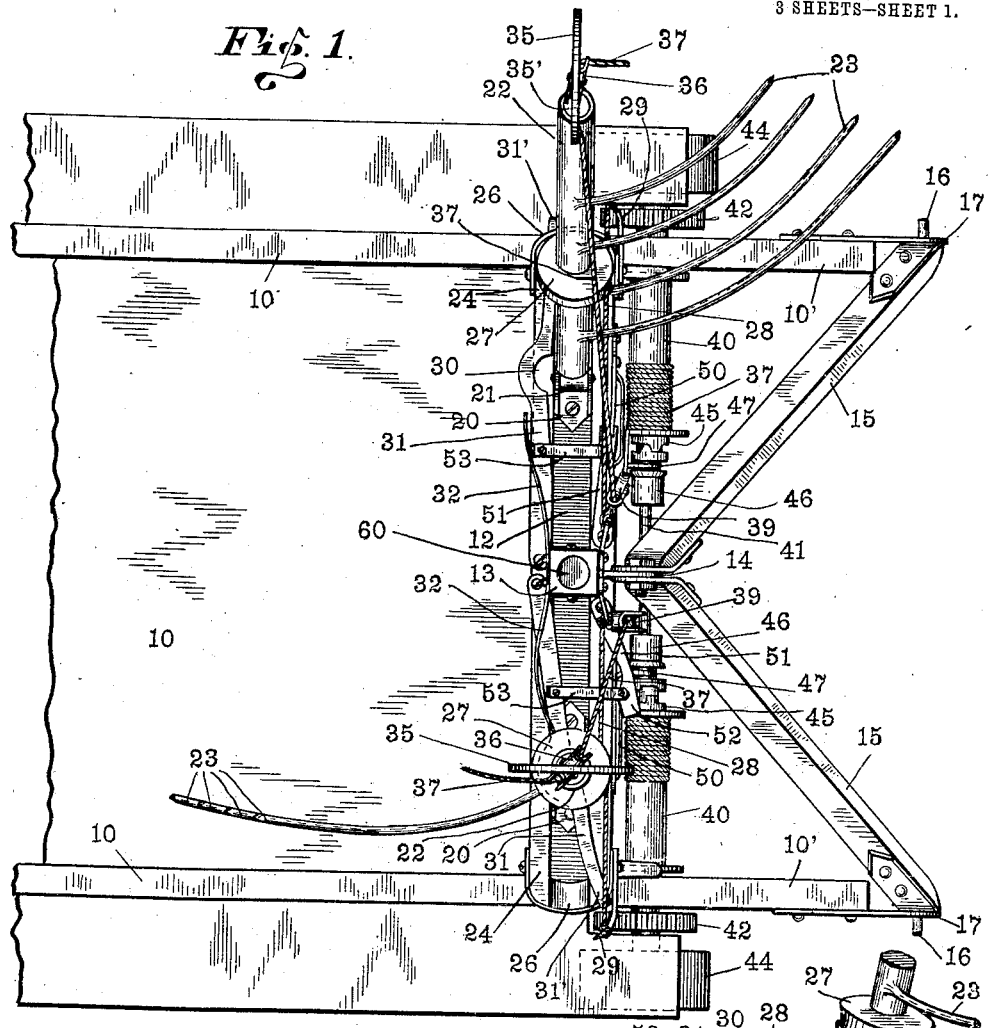
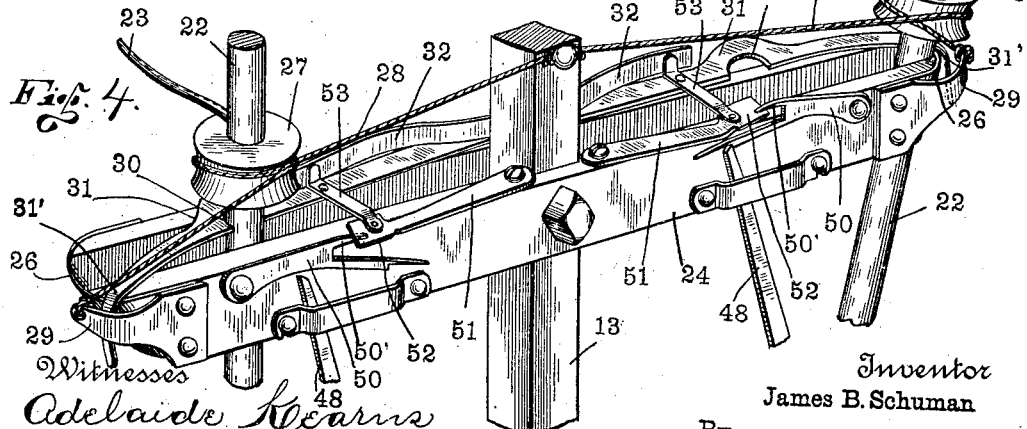
Witnesses
Adelaide Kearns
J. A. Walsh
Inventor
James B. Schuman
By
Bradford Hood
Attorneys No. 840,019. PATENTED JAN. 1, 1907.
J. B. SCHUMAN.
SHOCK HANDLING ATTACHMENT FOR CROP TREATING MACHINES.
APPLICATION FILED APR. 17, 1905.
3 SHEETS—SHEET 2.
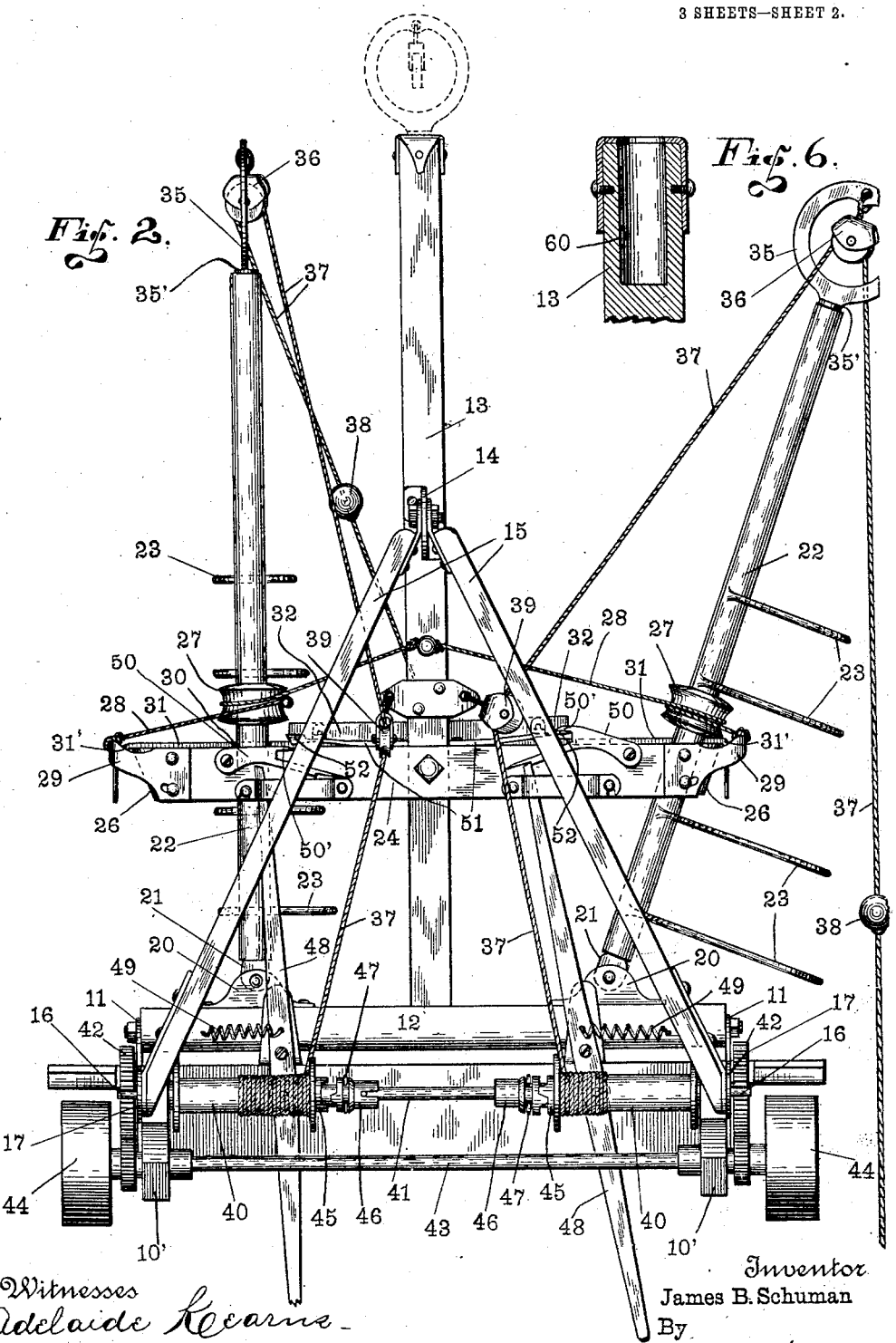
Witnesses
Adelaide Kearns
J. A. Walsh
Inventor
James B. Schuman
By Bradford Hood
Attorney No. 840,019. PATENTED JAN. 1, 1907.
J. B. SCHUMAN.
SHOCK HANDLING ATTACHMENT FOR CROP TREATING MACHINES.
APPLICATION FILED APR. 17, 1905.
3 SHEETS—SHEET 3.
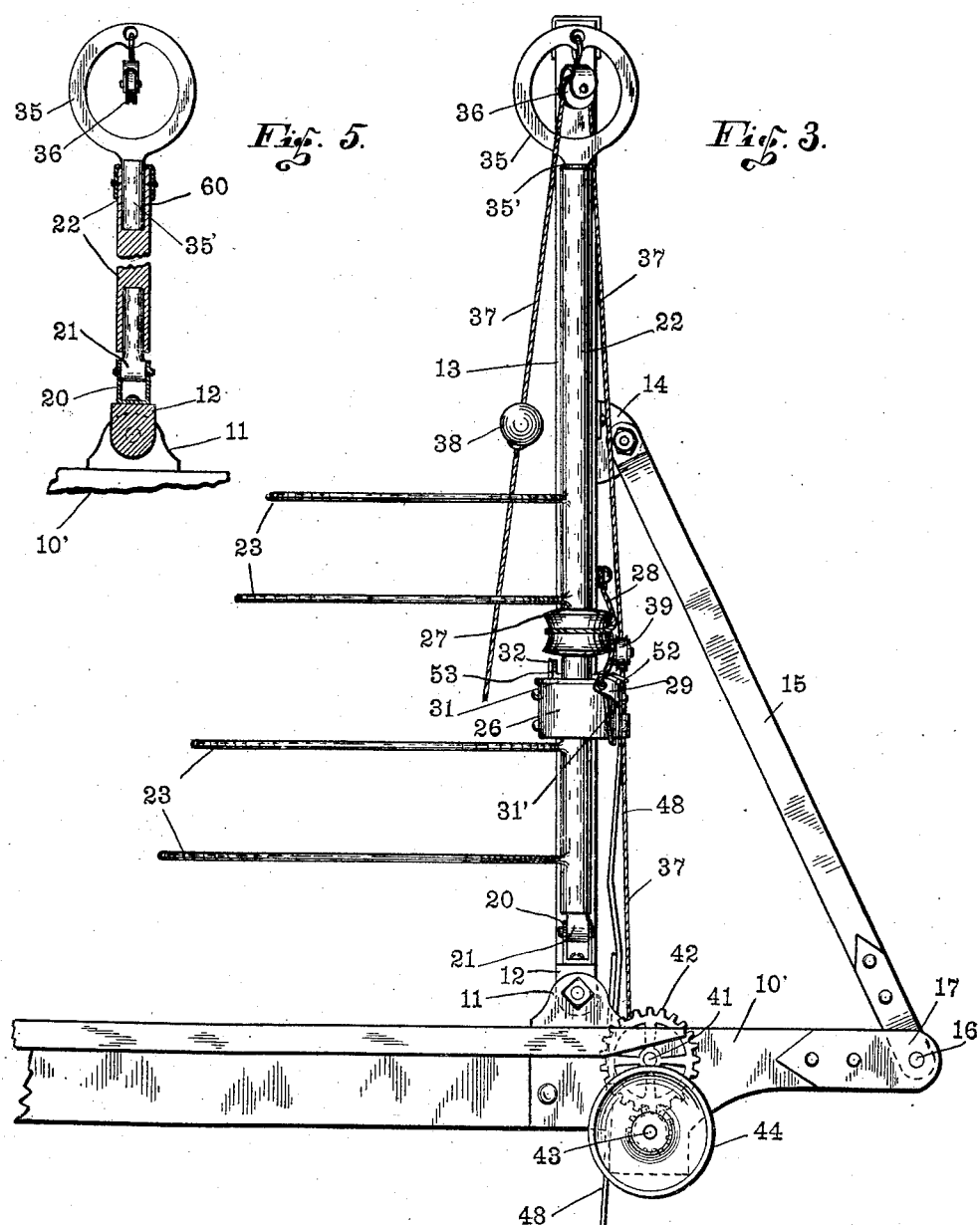
Witnesses
Adelaide Kearns
J. A. Walsh
Inventor
James B. Schuman
By Bradford & Hood
Attorneys

UNITED STATES PATENT OFFICE.

JAMES B. SCHUMAN, OF INDIANAPOLIS, INDIANA, ASSIGNOR TO JAMES B. SCHUMAN AND JOSEPH K. SHARPE, JR., OF INDIANAPOLIS, INDIANA, AND THEOPHILUS KING, OF QUINCY, MASSACHUSETTS, A COPARTNERSHIP.

SHOCK-HANDLING ATTACHMENT FOR CROP-TREATING MACHINES.

No. 840,019.

Specification of Letters Patent.

Patented Jan. 1, 1907.

Application filed April 17, 1905. Serial No. 256,082.

*To all whom it may concern:*

Be it known that I, JAMES B. SCHUMAN, a citizen of the United States, residing at Indianapolis, in the county of Marion and State of Indiana, have invented certain new and useful Improvements in Shock-Handling Attachments for Crop-Treating Machines, of which the following is a specification.

The object of my present invention is to provide means by which entire shocks may be lifted bodily to a point adjacent the receiving end of a shredder and the stalks maintained in an upright position in such manner that the operator may get the stalks without stooping to pick them up, the arrangement being such that the shock-embracing means forms part of the shock-lifting means and being also such that the lifting mechanism may be driven by power from the shredder.

The accompanying drawings illustrate my invention.

Figure 1 is a plan; Fig. 2, an end elevation; Fig. 3, a side elevation; Fig. 4, a perspective detail; Fig. 5, a detail vertical section of one of the masts, and Fig. 6 a sectional detail of the upper end of the central standard 13.

In the drawings, 10 indicates a shock-receiving platform, which is located adjacent the receiving end of a shredder. Pivoted to suitable standards 11 at the rear end of platform 10 is a transverse bar 12, which carries at its middle a suitable upright 13. This upright 13 is provided at an intermediate point with a rearwardly-projecting ear 14, to which are pivoted the upper ends of a pair of struts 15, the lower rear end of each of which is provided with a transverse pin 16, adapted to be slipped transversely into a perforation in an ear 17, extending rearward from the side beams 10' of the platform 10, the arrangement being such that by swinging the rear lower ends of the struts 15 toward each other pins 16 may be withdrawn from ears 17 and the structure described folded down for transportation.

Secured to the upper side of bar 12, one on each side of the upright 13, are two brackets 20 20, to each of which is pivoted on a horizontal pivot an upright stud 21, upon which is journaled a finger-shaft 22, said finger-shaft being thus rotatable upon a substantially vertical axis. Each finger-shaft carries a plurality of shock-embracing fingers 23.

Secured to upright 13 is a cross-head 24, which consists of a pair of parallel transverse bars between which each shaft 22 extends. Each end of the cross-head is closed by a bar or plate 26, which is adapted to limit the outward swing of the adjacent shaft 22.

Secured to each shaft 22 above the cross-head 24 is a grooved collar 27, around which an intermediate portion of a cable 28 is wrapped, the ends of said cable being attached to the upright 13 and a bracket 29, respectively, whereby when the shaft 22 is swung upon the horizontal pivot of the stud 21 it will be given a partial rotation by the action of cable 28. Each shaft 22 is adapted to enter the notch 30 of a latch-bar 31 and be thus held upright. Each latch-bar 31 is normally urged into the position shown in full lines at the left of Fig. 4 and the lower side of Fig. 1 by means of a spring 32, and each latch-bar is provided at its outer end with a portion 31', which is adapted to be engaged by the adjacent shaft 22 when it is swung to the position shown at the upper side of Fig. 1 and the right-hand end of Fig. 4. Pivoted in the upper end of each shaft 22 on a stem 35' is a head 35, which is adapted to serve as a support for a pulley-block 36, through which a lifting-cable 37 is passed. This lifting-cable is provided at its free end with any suitable form of shock-embracing means, (not shown,) and near this end is provided at an intermediate point with a button or enlargement 38, which cannot pass through the pulley-block. The other end of cable 37 is led through a suitable block 39 and from thence to a winding-drum 40, mounted on a shaft 41, which by a suitable train of gears 42 is driven by the shaft 43, carrying a pulley 44, which may be belted to the shredder. One end of each drum 40 is provided with a clutch member 45, adapted to be engaged by a sliding clutch member 46, which is keyed to the shaft 41 and which is operated by means of a yoke 47, pivoted to the lower end of a shifting lever 48, which is normally held by a spring 49 in such position as to withdraw clutch member 46 from clutch member 45. The upper end of each lever 48 is adapted to be held by a latch member 50, pivoted to the cross-head 24, said latch serving to hold the lever 48 against the action of spring 49, and thus hold clutch member 46 in engagement with clutch member 45. Pivoted to cross-head 24 adjacent each latch 50 is a releasing member 51, which is provided with a cam-shaped end 52, adapted to take under a finger 50', carried by the latch 50, in such manner as to withdraw said latch from lever 48. The releasing member 51 is connected by a link 53 with the adjacent catch 30.

The operation is as follows: The operator swings catch 30 to the position shown in full lines in the upper side of Fig. 1 and swings fingers 23 of the adjacent shaft 22 to the rear, this movement serving at the same time to swing the shaft 22 in a vertical plane to the position shown in full lines to the right of Fig. 2, where its upper end will lie beyond the side of the structure. The free end of the lifting-cable will then be carried to a shock at any desired distance from the machine and attached thereto in any desirable manner. The operator on the machine or the one on the ground then swings the proper lever 48 until it is caught by its latch 50, whereupon the corresponding winding-drum 40 will be driven and the lifting-cable wound up on the drum. When the button 38 comes into engagement with the pulley-block 36, a further pull on the lifting-cable serves to draw the upper end of the shaft 22 inward, and as this movement takes place the corresponding cable 28 causes the shaft 22 to rotate, thus swinging the fingers 23 from the position indicated at the upper side of Fig. 1 to the position indicated at the lower side of Fig. 1, the fingers thus serving to shift the lifted shock over onto the platform 10. As the shaft 23 swings inward the corresponding catch member 31 also moves inward until the shaft 22 reaches notch 30. At the same time link 53 shifts the member 51 so as to bring the cam portion 52 thereof beneath finger 50', and thereby lift the latch 50 so as to release lever 48, whereupon spring 49 shifts the same to the position shown at the left of Fig. 2, and thus withdraws the corresponding clutch 46 from driving engagement with its drum. As soon as this action occurs the weight of the shock is sufficient to unwind a portion of the cable from the drum, and thus permit the shock to drop upon the platform 10 and stand thereon in an upright position. When the band of the shock is cut, the stalks will fall back into the crotch formed between the cross-head 24 and the adjacent fingers 23 and be held upright, so that the operator can readily grasp a handful of them without stooping and then turn to feed them to the shredder. Each side of the structure operates independently of the other.

It will sometimes occur that the machine will be set in such position as to render it impracticable to use one side for lifting to the feeding-platform, and under such circumstances the operation would likely be too slow if only one of the lifting mechanisms were used. I deem it advisable, therefore, to make the standard 13 somewhat higher than the masts or shafts 22 and provide the upper end of said standard with a socket 60, which is adapted to receive the shank 35' of either head 35. That head 35 which belongs to the unoperated lifting mechanism is then withdrawn from its shaft 22 and placed in the socket 60, and because of the additional height of the standard 13 the lifting-cable may be carried to any point, even upon the same side of the machine as the lifting mechanism which is being operated, and the operator for this side of the machine may then devote his time to bringing in the shocks from distant points to a point convenient of access with the lifting mechanism which is carried by the mast 22 in commission, thus materially facilitating the operation of bringing the shocks to the feeding-platform.

I claim as my invention—

1. A lifting mechanism consisting of a mast, a pivotal support therefor permitting both swing of the mast in a substantially vertical plane and rotation thereof about its axis, a pulley-block supported at the upper free end of said mast, a lifting-cable passing through said block, an enlargement carried by the outer end of said cable and adapted to engage the pulley-block whereby further lifting pull upon the cable will swing the mast, means for positively rotating the mast on its axis and means for limiting the vertical swing of the mast.

2. In a lifting mechanism, the combination with a suitable support, of a mast pivotally and rotatably mounted thereon, gathering-arms carried by said mast, means for limiting the swing of the mast upon its pivotal support, means for rotating the mast, and lifting mechanism carried by said mast.

3. In a lifting mechanism, the combination with a suitable support, of a mast pivotally and rotatably mounted thereon, gathering-arms carried by said mast, means for limiting the swing of the mast upon its pivotal support, means for rotating the mast as it swings, and lifting mechanism carried by said mast.

4. In a lifting mechanism, the combination with a suitable support, of a mast pivotally and rotatably mounted thereon, gathering-arms carried by said mast, a pulley-block carried at the upper end of said mast, means for limiting the swing of the mast upon its pivotal support, means for rotating the mast as it swings, a lifting-cable passing through said pulley-block and provided at a point in its outer end with an enlargement too large to pass through the pulley-block.

5. In a lifting mechanism, the combination with a suitable support, of a mast pivotally and rotatably mounted thereon, gathering-arms carried by said mast, a pulley-block carried at the upper end of said mast, means for limiting the swing of the mast upon its pivotal support, means for rotating the mast, a lifting-cable passing through said pulley-block and provided at a point in its outer end with an enlargement too large to pass through the pulley-block.

6. In a lifting mechanism, the combination with a suitable support, of a mast pivotally and rotatably mounted thereon, gathering-arms carried by said mast, means for limiting the swing of said mast upon its pivot, a cord having its ends secured to the support and its middle wrapped about the mast, and lifting mechanism carried by the mast.

7. In a lifting mechanism, the combination with a suitable support, of a mast pivotally and rotatably mounted thereon, gathering-arms carried by said mast, means for limiting the swing of said mast upon its pivot, a cord having its ends secured to the support and its middle wrapped about the mast, a pulley-block carried at the upper free end of said mast, a lifting-cable passed through said pulley-block, and a button too large to pass through the pulley-block carried by the outer end of the cable.

8. In a lifting mechanism, the combination with a suitable support, of a mast pivotally and rotatably mounted thereon, gathering-arms carried by said mast, means for limiting the swing of said mast upon its pivot, means for rotating said mast, a pulley-block carried at the upper free end of said mast, a lifting-cable passed through said pulley-block, and a button too large to pass through the pulley-block carried by the outer end of the cable.

9. In a lifting mechanism, the combination with a suitable support, of a mast pivotally and rotatably mounted thereon, gathering-arms carried by said mast, means for limiting the swing of said mast upon its pivot, a cord having its ends secured to the support and its middle wrapped about the mast, lifting mechanism carried by the mast, a winding-drum to operate said lifting mechanism, driving means for said drum consisting in part of a separable clutch, and means controlled by the movement of the mast to automatically separate said clutch mechanism.

10. In a lifting mechanism, the combination with a suitable support, of a mast pivotally and rotatably mounted thereon, gathering-arms carried by said mast, means for limiting the swing of said mast upon its pivot, means for rotating said mast, lifting mechanism carried by the mast, a winding-drum to operate said lifting mechanism, driving means for said drum consisting in part of a separable clutch, and means controlled by the movement of the mast to automatically separate said clutch mechanism.

11. In a lifting mechanism, the combination with a suitable support, of a mast pivotally and rotatably mounted thereon, gathering-arms carried by said mast, means for limiting the swing of said mast upon its pivot, a cord having its ends secured to the support and its middle wrapped about the mast, a pulley-block carried at the upper free end of said mast, a lifting-cable passed through said pulley-block, a button too large to pass through the pulley-block carried by the outer end of the cable, a winding-drum adapted to receive said lifting-cable, driving means for said drum consisting in part of a separable clutch, and means controlled by the movement of the mast for automatically separating said clutch.

12. In a lifting mechanism, the combination with a suitable support, of a mast pivotally and rotatably mounted thereon, gathering-arms carried by said mast, means for limiting the swing of said mast upon its pivot, means for rotating said mast, a pulley-block carried at the upper free end of said mast, a lifting-cable passed through said pulley-block, a button too large to pass through the pulley-block carried at the outer end of the cable, a winding-drum adapted to receive said lifting-cable, driving means for said drum consisting in part of a separable clutch, and means controlled by the movement of the mast for automatically separating said clutch.

13. In a lifting mechanism, the combination with a suitable support, of a mast pivotally and rotatably mounted thereon, gathering-arms carried by said mast, means for limiting the swing of said mast upon its pivot, a cord having its ends secured to the support and its middle wrapped about the mast, a pulley-block carried at the upper free end of said mast, a lifting-cable passed through said pulley-block, a button too large to pass through the pulley-block carried by the outer end of the cable, a winding-drum adapted to receive said lifting-cable, driving means for said drum consisting in part of a separable clutch, means controlled by the movement of the mast for automatically separating said clutch, a lever for shifting said clutch, a latch for holding said lever in opposition to the automatic separating means, a catch adapted to engage the mast and hold it against swing, and a latch-operating member controlled by said catch, all substantially as and for the purpose set forth.

14. In a lifting mechanism, the combination with a suitable support, of a pair of masts each pivotally and rotatably mounted thereon, gathering-arms carried by each of said masts, means for limiting the swing of each mast upon its pivotal support, means for rotating each mast independently as it swings, and lifting mechanism carried by each mast.

15. In a lifting mechanism, the combination with a suitable support, of a pair of masts each pivotally and rotatably mounted thereon, gathering-arms carried by each of said masts, means for limiting the swing of each mast upon its pivotal support, means for rotating each mast independently, lifting mechanism carried by each mast, and a mast higher than the movable masts arranged between said movable masts and adapted to support lifting mechanism, for the purpose set forth.

16. A lifting mechanism consisting of, a mast, a pivotal support therefor permitting such a swing of the mast that its outer end will rise as it approaches discharging position and the mast will rotate on its axis, a pulley-block supported at the upper free end of said mast, a lifting-cable passing through said block, an enlargement carried by the outer end of said cable and adapted to engage the pulley-block whereby further lifting pull upon the cable will swing the mast, means for positively rotating the mast on its axis, and means for limiting the swing of the mast.

17. A lifting mechanism consisting of, a rotatable mast, a pivotal support therefor permitting such a swing of the mast that its outer end will rise as it approaches discharging position, a pulley-block supported at the upper free end of said mast, a lifting-cable supported at the upper free end of said mast, an enlargement carried by the outer end of said cable and adapted to engage the pulley-block whereby further lifting pull upon the cable will swing the mast, means for limiting the further swing of the mast, means for rotating the mast as it swings, and gathering-arms carried by said mast.

In witness whereof I have hereunto set my hand and seal, at Indianapolis, Indiana, this 12th day of April, A. D. 1905.

JAMES B. SCHUMAN. [L. S.]

Witnesses:
ARTHUR M. HOOD,
JAMES A. WALSH.